(12) United States Patent
Wang et al.

(10) Patent No.: US 12,259,572 B2
(45) Date of Patent: Mar. 25, 2025

(54) OPTICAL COMPOSITE STRUCTURE

(71) Applicant: Optivision Technology Inc., Hsinchu (TW)

(72) Inventors: Chung-Wei Wang, Hsinchu (TW); Li-Jen Hsu, Zhuangwei Township, Yilan County (TW); Hao-Ying Hsu, Taoyuan (TW)

(73) Assignee: OPTIVISION TECHNOLOGY INC., Hsinchu (TW)

( * ) Notice: Subject to any disclaimer, the term of this patent is extended or adjusted under 35 U.S.C. 154(b) by 0 days.

(21) Appl. No.: 18/544,094

(22) Filed: Dec. 18, 2023

(65) Prior Publication Data

US 2025/0060525 A1      Feb. 20, 2025

(30) Foreign Application Priority Data

Aug. 18, 2023   (TW) .................................. 112131113

(51) Int. Cl.
*F21V 8/00*      (2006.01)

(52) U.S. Cl.
CPC ......... *G02B 6/0053* (2013.01); *G02B 6/0036* (2013.01); *G02B 6/0031* (2013.01)

(58) Field of Classification Search
CPC ... G02B 6/0031; G02B 6/0036; G02B 6/0053
See application file for complete search history.

(56) References Cited

U.S. PATENT DOCUMENTS

2024/0126003 A1*   4/2024   Chen .................... G02B 6/0053

FOREIGN PATENT DOCUMENTS

| CN | 208270892 U | 12/2018 | |
|---|---|---|---|
| CN | 110928053 A | 3/2020 | |
| CN | 117950223 A * | 4/2024 | ........... G02B 6/0053 |

OTHER PUBLICATIONS

Innovation Q+ NPL Search (Year: 2024).*
Search Report appended to an Office Action, which was issued to Taiwanese counterpart application No. 112131113 by the TIPO on May 8, 2024, with an English translation thereof (2 pages).

* cited by examiner

*Primary Examiner* — Anabel Ton
(74) *Attorney, Agent, or Firm* — HSML P.C.

(57) ABSTRACT

An optical composite structure includes first, second and third prism sheets. The first prism sheet has a first light incident surface and a first light exit surface opposite to each other. The second prism sheet has a second light incident surface facing the first light exit surface and a second light exit surface opposite to the second light incident surface, and includes a haze layer having the second light incident surface and a prism layer which is stacked on the haze layer and which has the second light exit surface. The third prism sheet has a third light incident surface facing the second light exit surface, and includes a haze layer and a prism layer stacked on the haze layer of the third prism sheet. The haze layer of the third prism sheet has a haze greater than a haze of the haze layer of the second prism sheet.

9 Claims, 4 Drawing Sheets

OPTICAL COMPOSITE STRUCTURE

CROSS-REFERENCE TO RELATED APPLICATION

This application claims priority to Taiwanese Invention Patent Application No. 112131113, filed on Aug. 18, 2023, and incorporated by reference herein in its entirety.

FIELD

The disclosure relates to a composite structure, and more particularly to an optical composite structure.

BACKGROUND

Referring to FIGS. 1 and 2, a conventional backlight module 400 includes a light source assembly 401 and a composite structure 402. The light source assembly 401 includes a light guide plate 401a and a reflector 401b that are stacked on each other, and a light source 401c disposed proximate to a side of the light guide plate 401a. A top surface of the light guide plate 401a is a light exit surface 401d. The composite structure 402 includes a lower diffuser 402a, a lower prism sheet 402b, and an upper prism sheet 402c that are sequentially stacked on one another, and the lower diffuser 402a is disposed between the light exit surface 401d of the light guide plate 401a and the lower prism sheet 402b. A prism layer of the lower prism sheet 402b and a prism layer of the upper prism sheet 402c face upwardly and are disposed oppositely to the light source assembly 401, and an extending direction of the prism layer of the lower prism sheet 402b is perpendicular to an extending direction of the prism layer of the upper prism sheet 402c. The composite structure 402 further includes an upper haze layer 402d disposed on a bottom surface of the upper prism sheet 402c. The light source 401c provides light energy for the backlight module 400, and generally includes a plurality of light emitting diodes (LEDs) that are arranged as a light bar (i.e., transferring a plurality of point light sources into a line light source). After light emitted from the light source 401c laterally enters into the light guide plate 401a, such light is guided by the light guide plate 401a and is reflected by the reflector 401b disposed below the light guide plate 401a such that the light moves upwardly and serves as a surface light source, which then passes through the lower diffuser 402a, the lower prism sheet 402b, and the upper prism sheet 402c, so as to achieve a desired optical effect. However, in order to evenly disperse light, the lower diffuser 402a generally has a relatively greater haze, resulting in a reduced overall brightness of the backlight module 400. In addition, the backlight module 400 has a wide light viewing angle, which may not meet a user's needs in some circumstances.

SUMMARY

Therefore, an object of the disclosure is to provide an optical composite structure that can alleviate at least one of the drawbacks of the prior art.

According to the disclosure, an optical composite structure is adapted to be combined with a light source assembly having a light exit surface. The optical composite structure includes a first prism sheet, a second prism sheet, and a third prism sheet.

The first prism sheet has a first light incident surface facing the light exit surface of the light source assembly, and a first light exit surface opposite to the first light incident surface.

The second prism sheet has a second light incident surface facing the first light exit surface and a second light exit surface opposite to the second light incident surface, and includes a haze layer having the second light incident surface and a prism layer which is stacked on the haze layer and which has the second light exit surface.

The third prism sheet has a third light incident surface facing the second light exit surface and a third light exit surface opposite to the third light incident surface, and includes a haze layer having the third light incident surface and a prism layer which is stacked on the haze layer of the third prism sheet and which has the third light exit surface. The haze layer of the third prism sheet has a haze greater than a haze of the haze layer of the second prism sheet.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
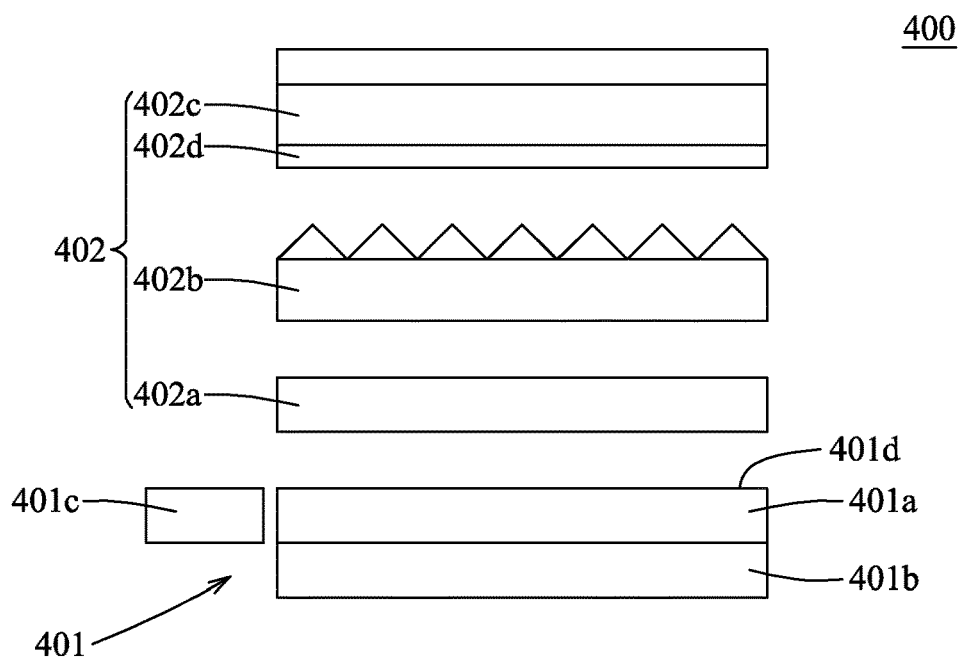
FIG. 1 is a schematic view illustrating a conventional backlight module.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 3:
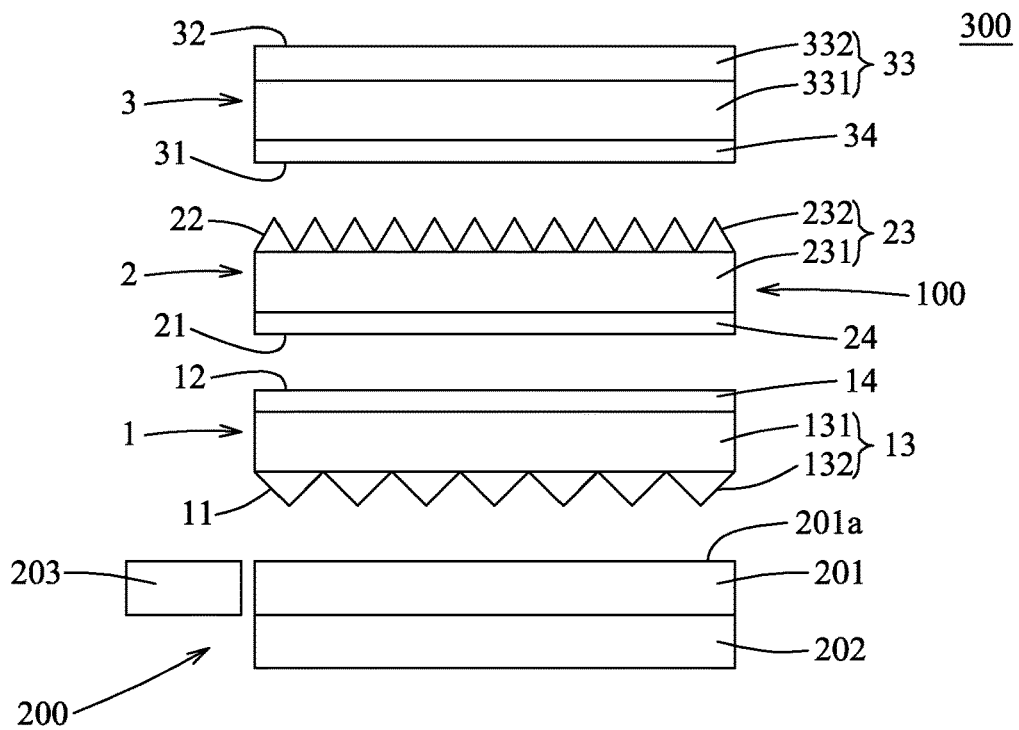
FIG. 3 is a schematic view illustrating a backlight module which includes a first embodiment of an optical composite structure according to the disclosure and a light source assembly.
Figure 4:
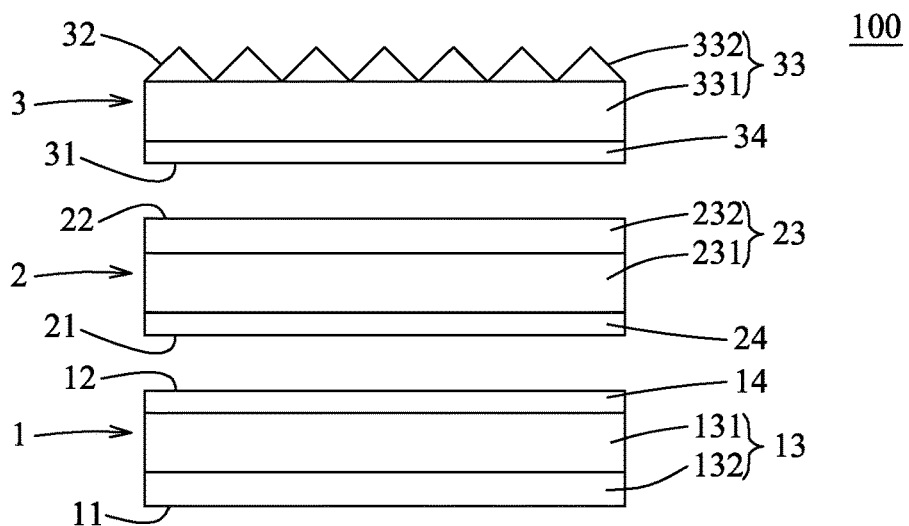
FIG. 4 is a schematic view illustrating the first embodiment of the optical composite structure according to the disclosure.

Referring to FIGS. 3 and 4, a first embodiment of an optical composite structure 100 according to the present disclosure is combined with a light source assembly 200 to form a backlight module 300. The light source assembly 200 has a light exit surface 201a. The light source assembly 200 includes a light guide plate 201 and a reflector 202 that are stacked on each other, and a light source 203 disposed proximate to a side of the light guide plate 201. A top surface of the light guide plate 201 is a light exit surface 201a. The first embodiment of the optical composite structure 100 includes a first prism sheet 1, a second prism sheet 2 and a third prism sheet 3 that are sequentially disposed on the light source assembly 200. There are no particular limitations on the material and refractive index of each of the first prism sheet 1, the second prism sheet 2 and the third prism sheet 3. In certain embodiments, each of the first prism sheet 1, the second prism sheet 2 and the third prism sheet 3 may be made of a polymer composite material, and may have a refractive index ranging from 1.4 to 1.7.

The first prism sheet 1 has a first light incident surface 11 facing the light exit surface 201a of the light source assembly 200 and a first light exit surface 12 opposite to the first light incident surface 11, and includes a prism layer 13 having the first light incident surface 11 and a haze layer 14 which is stacked on the prism layer 13 and which has the first light exit surface 12. The prism layer 13 of the first prism sheet 1 includes a base portion 131 and a prism portion 132 which is disposed on the base portion 131 and which has the first light incident surface 11. The prism portion 132 of the first prism sheet 1 has an apical angle ranging from 50° to 120°. In this embodiment, the apical angle of the prism portion 132 of the first prism sheet 1 is 90°.

The haze layer 14 of the first prism sheet 1 is disposed on a top surface of the base portion 131, and has the first light exit surface 12. The haze layer 14 of the first prism sheet 1 may have a haze up to 20%. In this embodiment, the haze of the haze layer 14 of the first prism sheet 1 is 10%. The first light incident surface 11 is a bottom surface of the prism portion 132 of the prism layer 13 of the first prism sheet 1, and the first light exit surface 12 is a top surface of the haze layer 14 of the first prism sheet 1.

The second prism sheet 2 has a second light incident surface 21 facing the first light exit surface 12 and a second light exit surface 22 opposite to the second light incident surface 21, and includes a haze layer 24 having the second light incident surface 21 and a prism layer 23 which is stacked on the haze layer 24 and which has the second light exit surface 22. The prism layer 23 of the second prism sheet 2 includes a base portion 231 and a prism portion 232 which is disposed on the base portion 231 and which has the second light exit surface 22. The prism portion 232 of the second prism sheet 2 has an apical angle ranging from 50° to 120°. In this embodiment, the apical angle of the prism portion 232 of the second prism sheet 2 is 60°.

The haze layer 24 of the second prism sheet 2 is disposed on the base portion 231 opposite to the prism portion 232 and has the second light incident surface 21. The haze layer 24 of the second prism sheet 2 may have a haze ranging from 1% to 20%. In this embodiment, the haze of the haze layer 24 of the second prism sheet 2 is 10%. The second light incident surface 21 is a bottom surface of the haze layer 24 of the second prism sheet 2, and the second light exit surface 22 is a top surface of the prism portion 232 of the second prism sheet 2.

The third prism sheet 3 has a third light incident surface 31 facing the second light exit surface 22 and a third light exit surface 32 opposite to the third light incident surface 31, and includes a haze layer 34 having the third light incident surface 31 and a prism layer 33 which is stacked on the haze layer 34 of the third prism sheet 3 and which has the third light exit surface 32. The prism layer 33 of the third prism sheet 3 includes a base portion 331 and a prism portion 332 which is disposed on the base portion 331 and which has the third light exit surface 32. The prism portion 332 of the prism layer 33 of the third prism sheet 3 has an apical angle ranging from 50° to 150°. In this embodiment, the apical angle of the prism portion 332 of the prism layer 33 of the third prism sheet 3 is 90°. In certain embodiments, a difference obtained by subtracting the apical angle of the prism portion 232 of the prism layer 23 of the second prism sheet 2 from the apical angle of the prism portion 332 of the prism layer 33 of the third prism sheet 3 may range from −1° to 80°. In this embodiment, the difference obtained by subtracting the apical angle (60°) of the prism portion 232 of the prism layer 23 of the second prism sheet 2 from the apical angle (90°) of the prism portion 332 of the prism layer 33 of the third prism sheet 3 is 30°. In certain embodiments, a difference obtained by subtracting the apical angle of the prism portion 132 of the prism layer 13 of the first prism sheet 1 from the apical angle of the prism portion 332 of the prism layer 33 of the third prism sheet 3 may range from −1° to 80°. In this embodiment, the difference obtained by subtracting the apical angle (90°) of the prism portion 132 of the prism layer 13 of the first prism sheet 1 from the apical angle (90°) of the prism portion 332 of the prism layer 33 of the third prism sheet 3 is 0°.

In this embodiment, an extending direction of the prism portion 132 of the prism layer 13 of the first prism sheet 1 is parallel to an extending direction of the prism portion 232 of the prism layer 23 of the second prism sheet 2, and an extending direction of the prism portion 332 of the prism layer 33 of the third prism sheet 3 is perpendicular to the extending direction of each of the prism portion 132 of the prism layer 13 of the first prism sheet 1 and the prism portion 232 of the prism layer 23 of the second prism sheet 2. In alternative embodiments, the extending direction of each of the prism portion 132 of the prism layer 13 of the first prism sheet 1, the prism portion 232 of the prism layer 23 of the second prism sheet 2, and the prism portion 332 of the prism layer 33 of the third prism sheet 3 may be adjusted depending on practical requirements.

The haze layer 34 of the third prism sheet 3 is disposed on the base portion 331 of the third prism sheet 3 opposite to the prism portion 332 of the third prism sheet 3, and has the third light incident surface 31. The haze layer 34 of the third prism sheet 3 has a haze greater than the haze of the haze layer 24 of the second prism sheet 2. The haze of the haze layer 34 of the third prism sheet 3 may range from 10% to 50%. In this embodiment, the haze of the haze layer 34 of the third prism sheet 3 is 20%. The third light incident surface 31 is a bottom surface of the haze layer 34 of the third prism sheet 3, and the third light exit surface 32 is a top surface of the prism portion 332 of the third prism sheet 3.

It is noted that the haze of each of the haze layer 34 of the third prism sheet 3 and the haze layer 24 of the second prism sheet 2 may be adjusted depending on practical requirements, but the haze of the haze layer 34 of the third prism sheet 3 is greater than the haze of the haze layer 24 of the second prism sheet 2 in all circumstances. For example, the haze of the haze layer 34 of the third prism sheet 3 may range from 0.5% to 30%, such as 10% or 15%, and the haze of the haze layer 24 of the second prism sheet 2 may be 5%.

There is no particular limitation on a material of each of the haze layer 14 of the first prism sheet 1, the haze layer 24 of the second prism sheet 2 and the haze layer 34 of the third prism sheet 3. In certain embodiments, each of the haze layer 14 of the first prism sheet 1, the haze layer 24 of the second prism sheet 2 and the haze layer 34 of the third prism sheet 3 may be made of a photo-curable material, and may be formed by an ultraviolet coating process.

Figure 5:
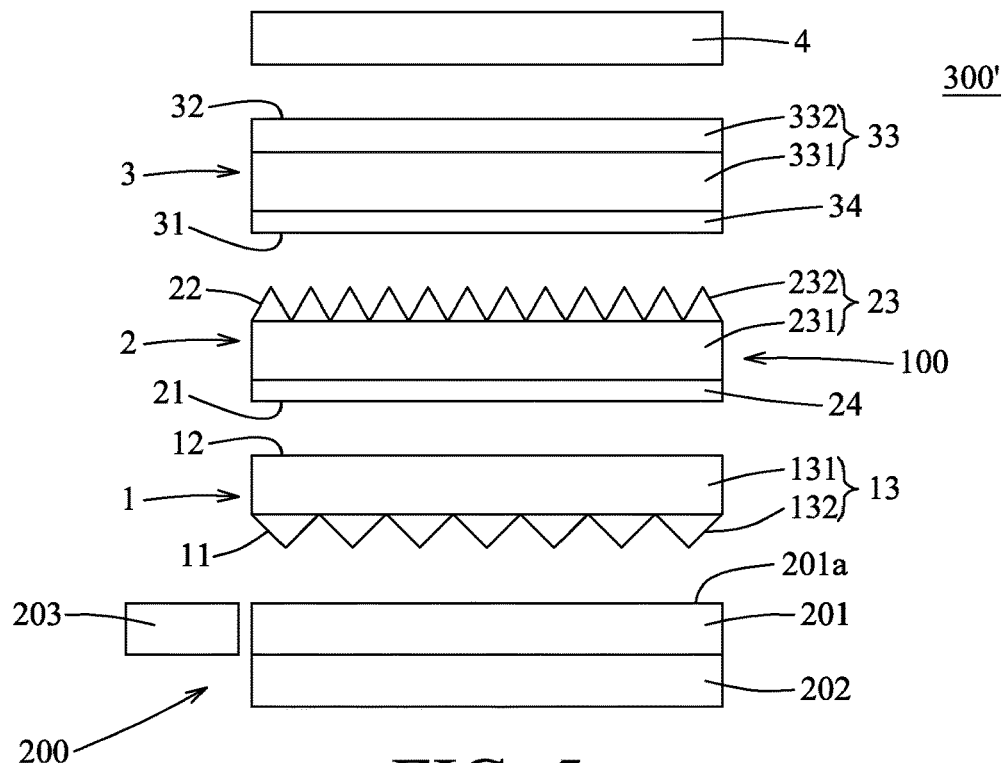
FIG. 5 is a schematic view illustrating a backlight module which includes a second embodiment of the optical composite structure according to the disclosure and the light source assembly.
Figure 6:
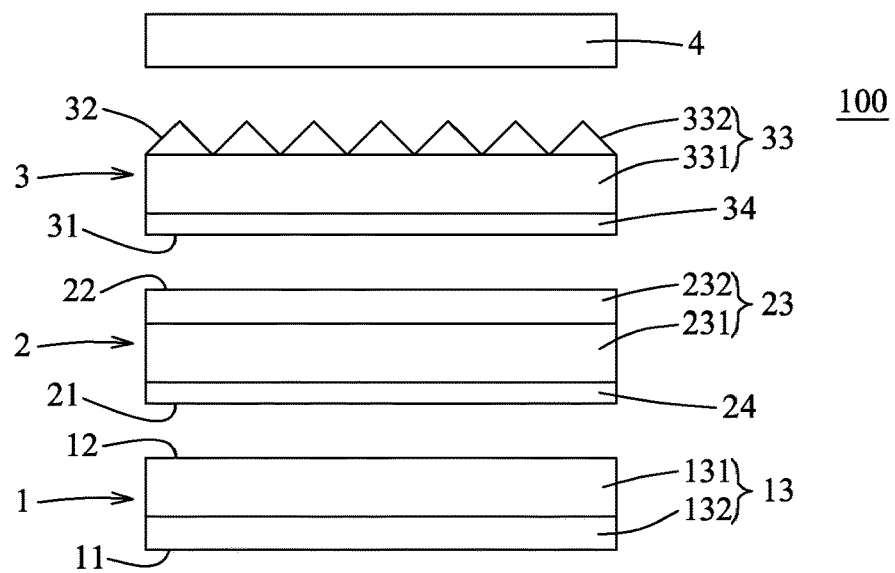
FIG. 6 is a schematic view illustrating the second embodiment of the optical composite structure according to the disclosure.

Referring to FIGS. 5 and 6, a second embodiment of the optical composite structure 100 according to the present disclosure is combined with the light source assembly 200 to form a backlight module 300'. The second embodiment of the optical composite structure 100 according to the present disclosure is generally similar to the first embodiment, except that, in the second embodiment, the optical composite structure 100 further includes a diffuser 4 disposed on the third light exit surface 32 of the third prism sheet 3, and the first prism sheet 1 does not include the haze layer 14 (see FIGS. 3 and 4). In the second embodiment, the first light exit surface 12 is a top surface of the base portion 131 of the prism layer 13 of the first prism sheet 1. The diffuser 4 may have a haze ranging from 10% to 60%, such as up to 50%. In this embodiment, the haze of the diffuser 4 is 50%.

Figure 2:
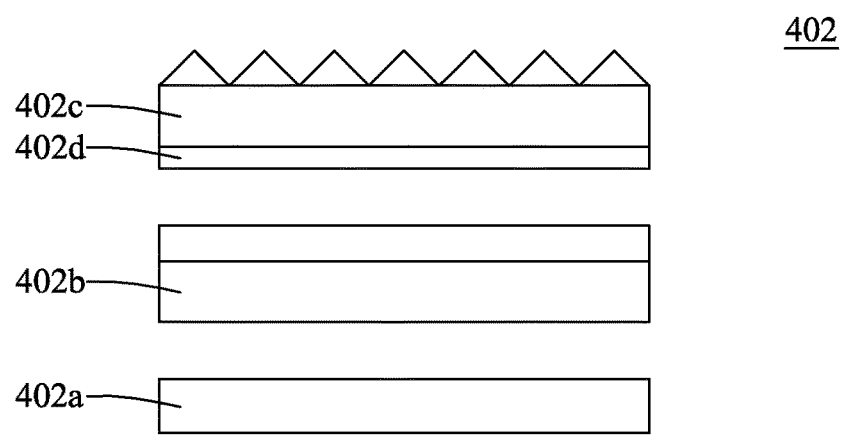
FIG. 2 is a schematic view illustrating a composite structure of the conventional backlight module of FIG. 1.

As shown in FIGS. 1 and 2, in the backlight module 400, each of the lower prism sheet 402b and the upper prism sheet 402c has an apical angle of 90°, the lower prism sheet 402b has a haze of at least 95%, and the upper haze layer 402d has a haze of 30%.

In the first embodiment, an average brightness of the backlight module 300 with respect to various viewing angles is 1.6 times of an average brightness of the backlight module 400 (see FIGS. 1 and 2) with respect to various viewing angles. In the second embodiment, an average brightness of the backlight module 300' with respect to various viewing angles is 1.7 times of the average brightness of the backlight module 400 with respect to various viewing angles.

Figure 7:
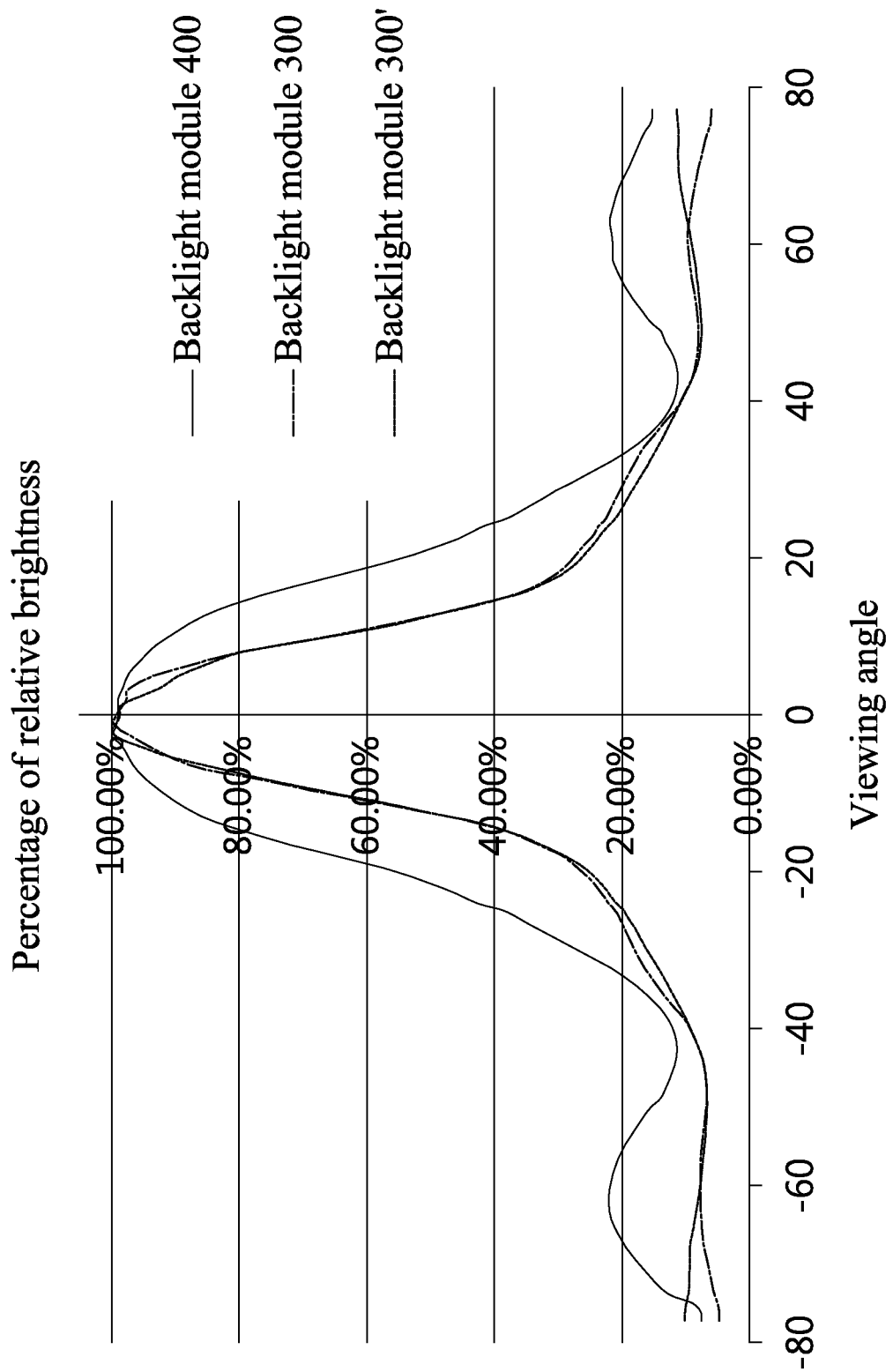
FIG. 7 is a plot showing correlation between the relative brightness and the viewing angle for each of the conventional backlight module of FIG. 1, and the first and second embodiments of the backlight module according to the disclosure.

FIG. 7 illustrates percentage of relative brightness of each of the backlight module 300, the backlight module 300', and the conventional backlight module 400 at a viewing angle that ranges from −80° to 80°. As shown in FIG. 7, a light output range of each of the backlight module 300 and the backlight module 300', which respectively include the first embodiment and the second embodiment of the optical composite structure 100 according to the present disclosure, is mainly concentrated on the viewing angle of a front side area (i.e., a smaller viewing angle range), which can meet user's needs in some circumstances and enhance an overall optical/visual quality of the backlight modules 300, 300'.

In sum, by having the haze layer 24 of the second prism sheet 2 and the haze layer 34 of the third prism sheet 3, an overall average brightness of each of the backlight module 300 and backlight module 300', which respectively include the first embodiment and the second embodiment of the optical composite structure 100 according to the present disclosure and which additionally include the light source assembly 200, can be effectively increased. In addition, damage (e.g., scratch) on the second prism sheet 2 and the third prism sheet 3 during an assembly process can be reduced, thereby increasing an assembly yield of the optical composite structure 100. In addition, due to smaller viewing angle of the backlight modules 300, 300', the user's needs in some circumstances can be met and the overall optical/visual quality of the backlight modules 300, 300' can be enhanced.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An optical composite structure adapted to be combined with a light source assembly having a light exit surface, said optical composite structure comprising:
  a first prism sheet having a first light incident surface facing said light exit surface of said light source assembly, and a first light exit surface opposite to said first light incident surface;
  a second prism sheet having a second light incident surface facing said first light exit surface and a second light exit surface opposite to said second light incident surface, and including a haze layer having said second light incident surface and a prism layer which is stacked on said haze layer and which has said second light exit surface; and
  a third prism sheet having a third light incident surface facing said second light exit surface and a third light exit surface opposite to said third light incident surface, and including a haze layer having said third light incident surface and a prism layer which is stacked on said haze layer of said third prism sheet and which has said third light exit surface, said haze layer of said third prism sheet having a haze greater than a haze of said haze layer of said second prism sheet,
  wherein said prism layer of said third prism sheet includes a base portion and a prism portion which is disposed on said base portion and which has said third light exit surface, and said haze layer of said third prism sheet is disposed on said base portion opposite to said prism portion and has said third light incident surface.

2. The optical composite structure as claimed in claim 1, wherein said haze of said haze layer of said third prism sheet ranges from 0.5% to 30%, and said haze of said haze layer of said second prism sheet ranges from 1% to 20%.

3. The optical composite structure as claimed in claim 1, wherein said haze of said haze layer of said third prism sheet ranges from 10% to 50%, and said haze of said haze layer of said second prism sheet ranges from 1% to 20%.

4. The optical composite structure as claimed in claim 1, wherein said prism layer of said second prism sheet includes a base portion and a prism portion which is disposed on said base portion and which has said second light exit surface, and said haze layer of said second prism sheet is disposed on said base portion opposite to said prism portion and has said second light incident surface.

5. An optical composite structure adapted to be combined with a light source assembly having a light exit surface, said optical composite structure comprising:
- a first prism sheet having a first light incident surface facing said light exit surface of said light source assembly, and a first light exit surface opposite to said first light incident surface;
- a second prism sheet having a second light incident surface facing said first light exit surface and a second light exit surface opposite to said second light incident surface, and including a haze layer having said second light incident surface and a prism layer which is stacked on said haze layer and which has said second light exit surface; and
- a third prism sheet having a third light incident surface facing said second light exit surface and a third light exit surface opposite to said third light incident surface, and including a haze layer having said third light incident surface and a prism layer which is stacked on said haze layer of said third prism sheet and which has said third light exit surface, said haze layer of said third prism sheet having a haze greater than a haze of said haze layer of said second prism sheet, wherein said first prism sheet includes a prism layer that has an apical angle ranging from 50° to 120°, said prism layer of said second prism sheet has an apical angle ranging from 50° to 120°, and said prism layer of said third prism sheet has an apical angle ranging from 50° to 150°.

6. The optical composite structure as claimed in claim 5, wherein a difference obtained by subtracting said apical angle of said prism layer of said second prism sheet from said apical angle of said prism layer of said third prism sheet ranges from −1° to 80°, and a difference obtained by subtracting said apical angle of said prism layer of said first prism sheet from said apical angle of said prism layer of said third prism sheet ranges from −1° to 80°.

7. The optical composite structure as claimed in claim 1, wherein said first prism sheet includes a prism layer having said first light incident surface, and a haze layer stacked on said prism layer of said first prism sheet and having said first light exit surface, said haze layer of said first prism sheet having a haze up to 20%.

8. The optical composite structure as claimed in claim 7, wherein said prism layer of said first prism sheet includes a base portion and a prism portion which is disposed on said base portion and which has said first light incident surface, and said haze layer of said first prism sheet is disposed on said base portion opposite to said prism portion and has said first light exit surface.

9. An optical composite structure adapted to be combined with a light source assembly having a light exit surface, said optical composite structure comprising:
- a first prism sheet having a first light incident surface facing said light exit surface of said light source assembly, and a first light exit surface opposite to said first light incident surface;
- a second prism sheet having a second light incident surface facing said first light exit surface and a second light exit surface opposite to said second light incident surface, and including a haze layer having said second light incident surface and a prism layer which is stacked on said haze layer and which has said second light exit surface; and
- a third prism sheet having a third light incident surface facing said second light exit surface and a third light exit surface opposite to said third light incident surface, and including a haze layer having said third light incident surface and a prism layer which is stacked on said haze layer of said third prism sheet and which has said third light exit surface, said haze layer of said third prism sheet having a haze greater than a haze of said haze layer of said second prism sheet,
- wherein said first prism sheet includes a prism layer that includes a base portion having said first light exit surface, and a prism portion disposed on said base portion and having said first light incident surface; and
- wherein said optical composite structure further comprises a diffuser which is disposed on said third light exit surface of said third prism sheet and which has a haze up to 50%.

* * * * *